United States Patent
Bichot et al.

(10) Patent No.: US 9,736,003 B1
(45) Date of Patent: Aug. 15, 2017

(54) COMMUNICATION METHOD IN A HOME NETWORK, NETWORK AND DEVICE FOR IMPLEMENTING SUCH A METHOD

(75) Inventors: Guillaume Bichot, La Chapelle Chaussée (FR); Gilles Straub, Acigné (FR)

(73) Assignee: Thomson Licensing, Issey-les-Moulineaux (FR)

( * ) Notice: Subject to any disclaimer, the term of this patent is extended or adjusted under 35 U.S.C. 154(b) by 0 days.

(21) Appl. No.: 09/719,147

(22) PCT Filed: Jun. 7, 1999

(86) PCT No.: PCT/EP99/03952
§ 371 (c)(1),
(2), (4) Date: Feb. 27, 2001

(87) PCT Pub. No.: WO99/65188
PCT Pub. Date: Dec. 16, 1999

(30) Foreign Application Priority Data

Jun. 6, 1998 (EP) .................................... 98401372
Sep. 28, 1998 (EP) .................................... 98402384

(51) Int. Cl.
*G06F 15/16* (2006.01)
*H04L 29/06* (2006.01)

(52) U.S. Cl.
CPC .................................. *H04L 29/06* (2013.01)

(58) Field of Classification Search
CPC ............................... H04L 69/16; H04L 69/18
(Continued)

(56) References Cited

U.S. PATENT DOCUMENTS

| 4,777,595 A | 10/1988 | Strecker et al. |
| 5,303,347 A | 4/1994 | Gagne et al. |

(Continued)

FOREIGN PATENT DOCUMENTS

| EP | 0 604 166 | 6/1994 | |
| FR | 2778046 | 10/1999 | ............. H04L 12/28 |

(Continued)

OTHER PUBLICATIONS

Peter M. Corcoran, et al "User Interface Technologies for Home Appliances and Networks", Jun. 17, 1998, IEEE, pp. 679-685.

(Continued)

*Primary Examiner* — Bharat N Barot
(74) *Attorney, Agent, or Firm* — Robert D. Shedd; Paul P. Kiel (57) ABSTRACT

The invention concerns a communication method in a home network comprising at least two devices connected to a communication bus, characterized in that, a first device including an internet application and a second device including means for connecting to the internet, said second device being able to manage at least one internet application protocol, said method comprises the steps of: sending a request from said first device to said second device for opening a connection between said first and second devices, wherein said request contains an internet application protocol identifier to identify the internet application protocol to be used over said connection; sending an internet protocol request under the format of said internet application protocol from said first device to said second device; forwarding said internet protocol request from said second device to an internet server; upon receipt; transferring a response from said internet server to said first device through said second device over said communication bus. The invention also (Continued)

concerns a network and a device for implementing the method above.

20 Claims, 4 Drawing Sheets

(58) Field of Classification Search
USPC ............... 709/202–203, 206–207, 217–219, 709/225–230, 245–246
See application file for complete search history.

(56) References Cited

U.S. PATENT DOCUMENTS

| | | | | |
|---|---|---|---|---|
| 5,537,417 | A * | 7/1996 | Sharma et al. | 709/228 |
| 5,710,908 | A * | 1/1998 | Man | 709/230 |
| 5,751,951 | A | 5/1998 | Osborne et al. | |
| 5,751,970 | A | 5/1998 | Bournas | |
| 5,757,801 | A | 5/1998 | Arimilli | |
| 5,790,804 | A * | 8/1998 | Osborne | 709/245 |
| 5,867,660 | A * | 2/1999 | Schmidt et al. | 709/227 |
| 5,884,025 | A * | 3/1999 | Baehr et al. | 713/201 |
| 5,892,910 | A * | 4/1999 | Safadi | 709/217 |
| 5,940,074 | A * | 8/1999 | Britt et al. | 715/749 |
| 5,940,387 | A * | 8/1999 | Humpleman | 370/352 |
| 5,960,177 | A * | 9/1999 | Tanno | 709/229 |
| 5,982,363 | A * | 11/1999 | Naiff | 715/721 |
| 6,021,132 | A | 2/2000 | Muller et al. | |
| 6,038,628 | A * | 3/2000 | Leung et al. | 710/305 |
| 6,047,338 | A | 4/2000 | Grolemund | |
| 6,055,236 | A * | 4/2000 | Nessett et al. | 709/245 |
| 6,058,434 | A * | 5/2000 | Wilt et al. | 719/310 |
| 6,085,251 | A * | 7/2000 | Fabozzi, II | 709/230 |
| 6,108,704 | A * | 8/2000 | Hutton et al. | 709/227 |
| 6,208,952 | B1 * | 3/2001 | Goertzel et al. | 709/230 |
| 6,222,855 | B1 | 4/2001 | Kimber et al. | 370/466 |
| 6,233,577 | B1 * | 5/2001 | Ramasubramani et al. | 707/9 |
| 6,243,743 | B1 * | 6/2001 | Freeny | 709/217 |
| 6,259,443 | B1 * | 7/2001 | Williams, Jr. | 715/741 |
| 6,285,659 | B1 * | 9/2001 | Feuerstraeter et al. | 370/244 |
| 6,311,220 | B1 * | 10/2001 | Fischer et al. | 709/230 |
| 6,353,614 | B1 * | 3/2002 | Borella et al. | 709/238 |
| 6,360,253 | B1 * | 3/2002 | Freeny | 709/217 |
| 6,393,497 | B1 * | 5/2002 | Arnold et al. | 719/330 |
| 6,418,324 | B1 * | 7/2002 | Doviak et al. | 455/426.1 |
| 6,425,013 | B1 * | 7/2002 | Schmidt et al. | 709/230 |
| 6,490,631 | B1 * | 12/2002 | Teich et al. | 709/250 |
| 6,496,858 | B1 * | 12/2002 | Frailong et al. | 709/221 |
| 6,496,867 | B1 * | 12/2002 | Beser et al. | 709/227 |
| 6,567,405 | B1 * | 5/2003 | Borella et al. | 370/389 |
| 6,912,588 | B1 | 6/2005 | Jardin et al. | |
| 6,973,555 | B2 * | 12/2005 | Fujiwara et al. | 709/206 |
| 6,990,107 | B1 * | 1/2006 | Rinne et al. | 370/469 |

FOREIGN PATENT DOCUMENTS

| | | |
|---|---|---|
| JP | 4000839 | 1/1992 |
| JP | 8256325 | 10/1996 |
| JP | 9247209 | 9/1997 |

OTHER PUBLICATIONS

Peter M. Corcoran, "Mapping Home-Network Appliances to TCP/IP Sockets using a three-tiered home Gateway Architecture", Jun. 17, 1998, IEEE, pp. 729-736.
Peter M. Corcoran et al. "Browser-Style Interfaces to a Home Automation Network", Jun. 17, 1998, IEEE, pgs. 1063-1069.
Peter M. Corcoran et al. "CEBus Network Access via the World-Wide-Web", 1996, IEEE, pp. 236-237.
Peter M. Corcoran et al "Browser and Applet Interfaces to CEBus Networks", pp. 328-329.
J. Desbonnet et al "System Arcnitecture and Implementation of a CEBus/Internet Gateway", IEEE, vol. 43, No. 4, Nov. 1, 1997, pp. 1057-1061.
D.J. Preston "Internet Protocols Migrate to Silicon for Networking Devices", Electronic Design, vol. 45, No. 8, Apr. 14, 1997, pp. 87-90.
B. Peisel "Designing the Next Step in Internet Appliances", Electronic Design, vol. 46, No. 7, Mar. 23, 1998, pp. 50, 52, 56.
Sony. et al., "Specification of the Home Audio/Video Interoperability (HAVI) Architecture". The HAVI Architecture, XP002115566, Version 0.8, 1998, pp. 24-29.
Sato, "Multipurpose Protocol Mediation System Delegate", Bulletin of the Electrotechnical Laboratory, vol. 59, No. 6, Jun. 20, 1995, pp. 1-17.

* cited by examiner

COMMUNICATION METHOD IN A HOME NETWORK, NETWORK AND DEVICE FOR IMPLEMENTING SUCH A METHOD

BACKGROUND

The invention concerns a communication method in a home network, in particular a HAVi-compliant network. It also concerns the network itself, and a device used in the implementation of the method. The invention applies among others to the communication between an internet application running on a network device which may not necessarily have a direct access to the internet, and a device of the network which does have such an access.

Figure 1:
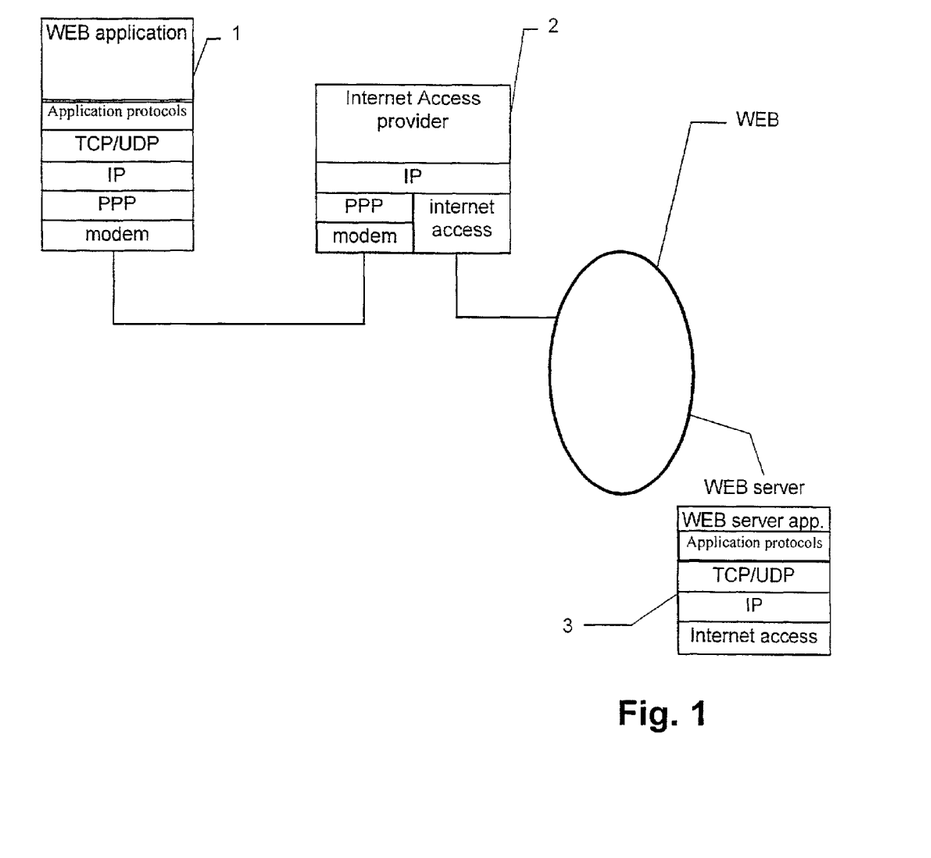
FIG. 1 is a schematic diagram of devices and connections for accessing an internet server from a home equipment.

FIG. 1 is a diagram of the different devices and software layers required to access Internet services from a personal computer 1. This computer 1 comprises an application including a user interface for interacting with a user, for example a 'WEB browser', qualified in FIG. 1 by the more general term 'WEB application'.

The WEB application lies above an application protocol layer (such as HTTP (Hypertext Transfer Protocol) or FTP (File Transfer Protocol) or another type of protocol). The next layers are, according to the example of FIG. 1, the TCP/UDP (Transmission Control Protocol, respectively User Data Protocol) layer, the IP (Internet Protocol) layer and the PPP layer. The TCP/UDP and IP layers combined are referred to as the 'IP stack'. The connection with an Internet access provider 2 is made through modems and the public switched telephone network. The internet access provider is connected to the internet, which comprises the server 3, the latter including layers globally similar in function to those of computer 1.

A user may own a number of devices such as television receivers and personal computers which have the Internet access functionality provided by the device 1 of FIG. 1. In such a case the hardware and software required for providing the Internet access capability is duplicated in each device.

SUMMARY

The object of the invention is a communication method in a home network comprising at least two devices connected to a communication bus, characterized in that, a first device including an internet application and a second device including means for connecting to the internet, said second device being able to manage at least one internet application protocol, said method comprises the steps of:

sending a request from said first device to said second device for opening a connection between said first and second devices, wherein said request contains an internet application protocol identifier to identify the internet application protocol to be used over said connection;

sending an internet protocol request under the format of said internet application protocol from said first device to said second device;

forwarding said Internet protocol request from said second device to an internet server;

upon receipt, transferring a response from said internet server to said first device through said second device over said communication bus.

By including into the network a device which has the means for connecting to the internet and which at the same time possesses the means to communicate with devices (or software elements such as applications) in the network, only one device with such a capacity is required for the entire network, regardless of the number of internet-related applications running in devices of this network.

Moreover, an internet application establishing an internet connection through the second device specifies itself the Internet application protocol it wishes to use. This provides a very flexible way to use different internet application protocols within a same network.

According to an embodiment of the invention, the inventive method includes the step of sending, by said first device to said second device, a request for a list of internet application protocols supported by said second device.

The invention also concerns a home communication network comprising devices connected by a communication bus, said network comprising at least one device including a WEB interface, said device comprising an IP stack and a connection to the internet, said at least one device comprising an application programmable interface for making said WEB interface accessible to software element clients of other devices in said network.

The invention also concerns a device in a home communication network characterized in that it comprises a WEB interface, said device also comprising an IP stack and a connection to the internet, said at least one device comprising an application programmable interface for making said WEB interface accessible to software element clients of other devices in said network.

BRIEF DESCRIPTION OF THE DRAWINGS

Other characteristics and advantages of the invention will appear through the description of a non-limiting embodiment of the invention, said description being made with reference to the following figures.

DETAILED DESCRIPTION

The following description uses a terminology defined in the following document, to which one should refer for further details: 'The HAVi Architecture—Specification of the Home Audio/Video interoperability (HAVi) Architecture' of May 11, 1998 Version 0.8 and publicly disclosed on May 15, 1998 on the WEB sites of at least the following companies: Sony, Philips, Toshiba, Sharp and Hitachi. Explanations and definitions regarding the terminology are also given at the end of the present description.

For further information regarding HTTP, which will be taken as an example as the protocol used by the WEB application of the present embodiment, the document 'Hypertext Transfer Protocol/1.1 RFC 2068' can be used as a reference. Other protocols than HTTP may be used: FTP, SMTP, POP, IMAP and NNTP are some examples.

An introduction to a HAVi-compliant network architecture will first be given, in order to define a number of concepts necessary for the description of the embodiment of the invention.

A HAVi network comprises devices which can be of four types, these devices being linked by a communication bus. The different device types are, ordered according to their network-related capabilities: Full AudioNideo devices (FAV devices), Intermediate AudioNideo Devices (IAV devices), Basic AudioNideo devices (BAV devices), and Legacy AudioNideo devices (LAV devices).

Except for the LAV-type devices, the other devices all have at least the capability of communicating with each other.

FAV devices contain a runtime environment for HAVi bytecode. HAVi bytecode is a programming language in which device control modules (DCMs) or applications may be written. A FAV device may thus download DCMs from or for other devices which do not include this runtime environment, for example for cost reasons.

IAV devices do not have the capability to run HAVi bytecode, but may include resident DCMs for the control of other devices.

BAV devices are devices which either contain DCM code downloadable by a FAV device, or which are controlled by a native DCM run by an IAV device.

LAV devices are devices which do not have any HAVi capability. These devices have their own command protocol and require that a FAV or an IAV device act as a gateway to the HAVi network and perform the necessary control command translation.

Each device contains a number of objects, called 'software elements' in the HAVi terminology. A control manager of a given function (called FCM) of a device, i.e. a software element providing an interface for controlling a specific functional component (e.g. tuner, display, mass storage . . . ) of a device is one of such objects. A DCM as mentioned above is another one.

Typically, a FAV device would contain a number of applications and device control applications which interact with the following software elements through corresponding application programmable interfaces:
  a 1394 Communication Media Manager, which allows other software elements to perform asynchronous and isochronous communication over the IEEE 1394 bus;
  a Message Passing System, for exchanging messages with other software elements;
  an Event Manager for managing object state changes;
  a Stream Manager for managing AudioNideo data streams between functional components, such as a tuner and a recording device;
  a Registry, which keeps a list of local software elements and its identifiers and manages communication with distant registries;
  Device Control Module Manager, for loading or deleting Device Control Modules;
  a number of either resident or uploaded Device Control Modules;
  a HAVi bytecode runtime environment for executing DCMs.

The Message Passing System allocates unique identifiers to software elements, which use these identifiers to register themselves with the Registry. These identifiers are called 'SEID', standing for Software Element Identifiers, and comprise a device identifier and a software element handle within that device. A first software element wishing to send a message to a second software element will pass the SEID of this second software element as a parameter in its command to the Message Passing System. It obtains this SEID by making an appropriate request with the local Registry service. Depending on whether the software element to be called is local or distant (i.e. in another device than the calling software element), the calling software element will use the whole SEID or only its software element handle part.

The mapping of function calls into messages of the Message Passing System is described in detail in Chapter 3.2.3 of the HAVi 0.8 document. The Message Passing System described in this version of the HAVi document can handle messages up to 64 Kb long.

The French patent application FR 9805110 filed on Apr. 23, 1998 in the name of THOMSON multimedia gives additional information about the Registry and the Message Passing System.

Figure 2:
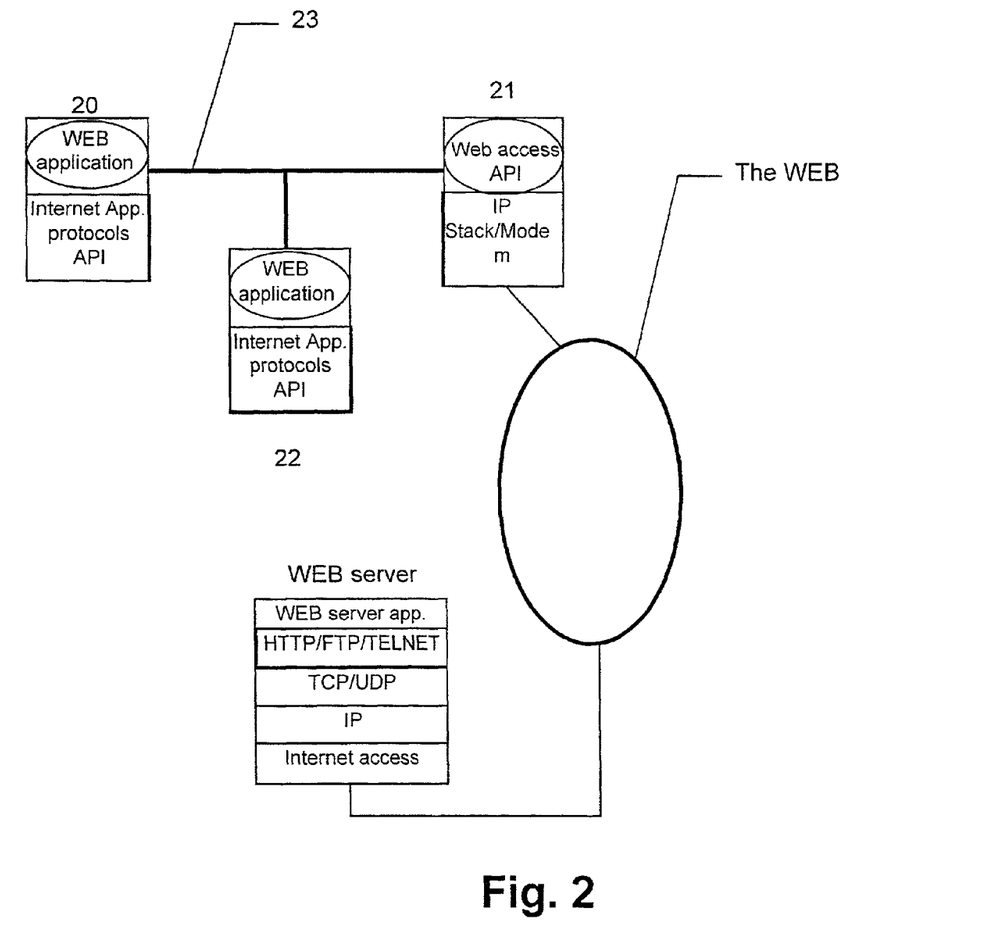
FIG. 2 is a diagram of a home network according to the present invention.

FIG. 2 represents a HAVi-compliant home network comprising devices 20, 21 and 22 connected to a communication bus 23. The bus 23 is for example an IEEE 1394 serial bus. Device 20 is a digital television receiver, compatible with the Digital Video Broadcast (DVB) standard in use in Europe or the Direct Satellite System (DSS) in use in the United States. It comprises a WEB application, i.e. a software application capable of sending and/or requesting data through the Internet using the HTTP protocol. For the purpose of the present example, the WEB application of device 20 is an electronic program guide (EPG) exchanging information with a given Internet server. Device 22 is a personal computer, whose WEB application is an Internet browser. Neither one of devices 20 and 22 possesses an IP stack, the PPP protocol layer or a modem connected to the public switched telephone network.

Device 21 comprises a WEB access application programming interface (WEB access API), as well as the IP stack, PPP protocol and a modem. Device 21 can be a FAV, a IAV or a BAV device. The functional component module (FCM) giving access to IP stack operation by the different WEB applications is called 'Internet Proxy Agent', or 'WEB Proxy Agent'. It provides the WEB access application programmable interface which is the layer above the IP stack.

According to the present example, the device 21 is a digital television decoder comprising a modem.

The WEB Proxy FCM offers a sharable access to the internet. It registers upon reset or hot-plugging at the local Registry of device 21, if that device is a FAV or IAV, or at the local registry of the FAV or IAV device which runs the Device Control Module corresponding to the WEB Proxy FCM if device 21 is of the BAV type.

The WEB application, which can also be referred to as 'WEB client', is able to detect the WEB Proxy FCM in the network by sending a request to its local Registry service. The local Registry dispatches the request to distant Registries and collects the responses. In the case of the present embodiment, only the identifier ('SEID') of the WEB Proxy FCM of device 21 will be detected.

The WEB Proxy FCM preferably supports at least several commonly used Internet protocols, such as HTTP, FTP, NNTP, SMTP, POP or IMAP. The WEB client uses the WEB Proxy FCM application programmable protocol through the Message Passing System. The application programmable interface comprises the following functions: Open, Close, Send, Receive and GetCapability.

These different functions will now be described in detail.

The following data structures are used by the functions of the WEB Proxy FCM:

(a) enum FileLoc {START, NEXT, END};

This data structure indicates whether the message from a producer to a consumer is the first message, an intermediate message or the last (or only) message in a sequence of messages. It is used in conjunction with the notion of buffer size at the WEB client or at the WEB Proxy FCM, since this buffer size, as explained later on, may cause a function call to be split over several messages.

(b) enum ProtocolType {HTTP, FTP, SMTP, POP3, IMAP4, NNTP, WAIS};

This data structure indicates the list of WEB application protocols the WEB proxy FCM may support.

The functions in the list below are implemented in the present system.

(a) 'Open' Function

This function allows the WEB client to open a connection with a WEB proxy FCM. The function prototype is defined as follows:

```
Status WEBProxy::Open(
            in ProtocolType protocol
            in short client_buffer_size,
            in OperationCode opCode,
            out long cid,
            out short proxy_buffer_size,
            )
```

'Status' is the type of the function return value.
The following parameters are used:
  protocol: this parameter, set by the WEB client, defines the protocol (HTTP . . . ) dedicated to the session the WEB client wants to open.
  client_buffer_size: this parameter, set by the WEB client, gives the maximum size of a message accepted by the WEB client, in other words the size of its message buffer. The WEB proxy FCM will use this parameter to define the size of messages sent to the client. Data to be sent by the WEB Proxy FCM will be split in a number of data blocks, depending on this parameter.
  opCode: this parameter is a code the WEB proxy FCM will use to forward an incoming response from the internet to the WEB client. This operation code identifies a function of the WEB client which the WEB Proxy FCM has to call to forward a response to the client. This parameter is set by the WEB client. In the present case, the value of the opCode identifies the function 'Receive'. The operation code uniquely identifies a function within a software element. The unique address of a function in the network thus comprises the 'SEID' identifier and the operation code.
  cid: this parameter is an identifier of the connection between the WEB client and the WEB proxy FCM. It is defined by the WEB Proxy FCM. It allows several connections from the same software component client to be opened in parallel (with the same WEB Proxy FCM or with other WEB Proxy FCMs) and also permits to match a response from the internet with a request.
  proxy_buffer_size: this parameter, returned by the WEB Proxy FCM, indicates the maximum size (in bytes) of a message accepted by the WEB proxy FCM. The WEB client will use this parameter to determine the size of messages, for example requests, sent by the WEB client to the WEB Proxy FCM.

After reception of the 'Open' function from a WEB client, the WEB Proxy FCM will return, along with the parameters above, one of the following status values:
'0' in case of successful session opening,
'1' in case of resource allocation error,
'2' if the protocol type is not supported by the WEB client.
(b) 'Close' Function This function enables a WEB client to close a previously opened connection with a WEB Proxy FCM, identified by the 'cid' parameter.

The function prototype is defined as follows:

```
Status WEBProxy::Open(
            in long cid
            )
```

The only parameter is the 'cid' parameter, i.e. the identifier of this connection with the WEB proxy FCM.

The WEB Proxy FCM acknowledges with one of the following status values:
0: The connection has been closed successfully,
1: The transmitted value of the 'cid' parameter is unknown.

(c) 'Send' Function

This function is called by a WEB client to send a request to a WEB server using the protocol (HTTP . . . ) previously defined by the 'Open' function call.

The function prototype is defined as follows:

```
Status WEBProxy::Send(
            in long cid,
            in FileLoc where,
            in sequence <byte> web_data,
            )
```

In addition to the already defined 'cid' parameter, the function's parameters are the following:
  where: this parameter, determined by the calling software element, indicates if the message is the first message, an intermediate message or the last message in a sequence of messages. More than one message may be required to call this function, since the amount of data transmitted in the function call may be too great for the buffer of the WEB Proxy FCM to handle in one single message.
  web_data: this parameter contains a part or the entire request according to the WEB "application" protocol used through the connection identified by the 'cid' parameter.

Upon receiving the function call, the WEB Proxy FCM acknowledges with one of the following status values:
'0' if the message was processed successfully,
'1' if the size of the 'web_data' exceeds the fixed maximum size,
'2' if it is impossible to process this message,
'3' if the transmitted value of the 'cid' parameter is unknown to the WEB Proxy FCM.

In case of error, the WEB client decides whether or not to close the connection or to send again the previous message.

(d) 'Receive' Function

This is the prototype of the function implemented in the WEB client which allows the WEB proxy FCM to forward to the WEB client an incoming response according to the WEB application protocol.

The function prototype is defined as follows:

```
Status WEBProxy::Receive(
            in long cid,
            in FileLoc where,
            in sequence <byte> web_data,
            )
```

In addition to the parameters already defined, the following parameter is used by the present function:

web_data: contains a part or the entire response according to the WEB "application" protocol used through the connection identified by the 'cid' parameter.

Following the call by the WEB Proxy server, the WEB client acknowledges with one of the following status values:

'0' if the message was processed successfully,
'1' if the size of data exceeds the fixed maximum size,
'2' if it is impossible for the WEB client to process this message,
'3' if the WEB client does not recognize the value of the 'cid' parameter.

In case of error, the WEB Proxy FCM does not react. It is up to the WEB client to decide whether it maintains the connection or not.

(e) 'GetCapability' Function

This function, callable by the WEB client, returns the list of protocols which the WEB Proxy FCM supports.

The function prototype is the following:

```
Void WEBProxy::GetCapability(
    out sequence <ProtocolType> ProtocolList
)
```

The sole parameter of the function is 'ProtocolList', which is the list of WEB application protocols which are available through the FCM. More than one protocol may be supported by the WEB Proxy FCM.

Figure 3:
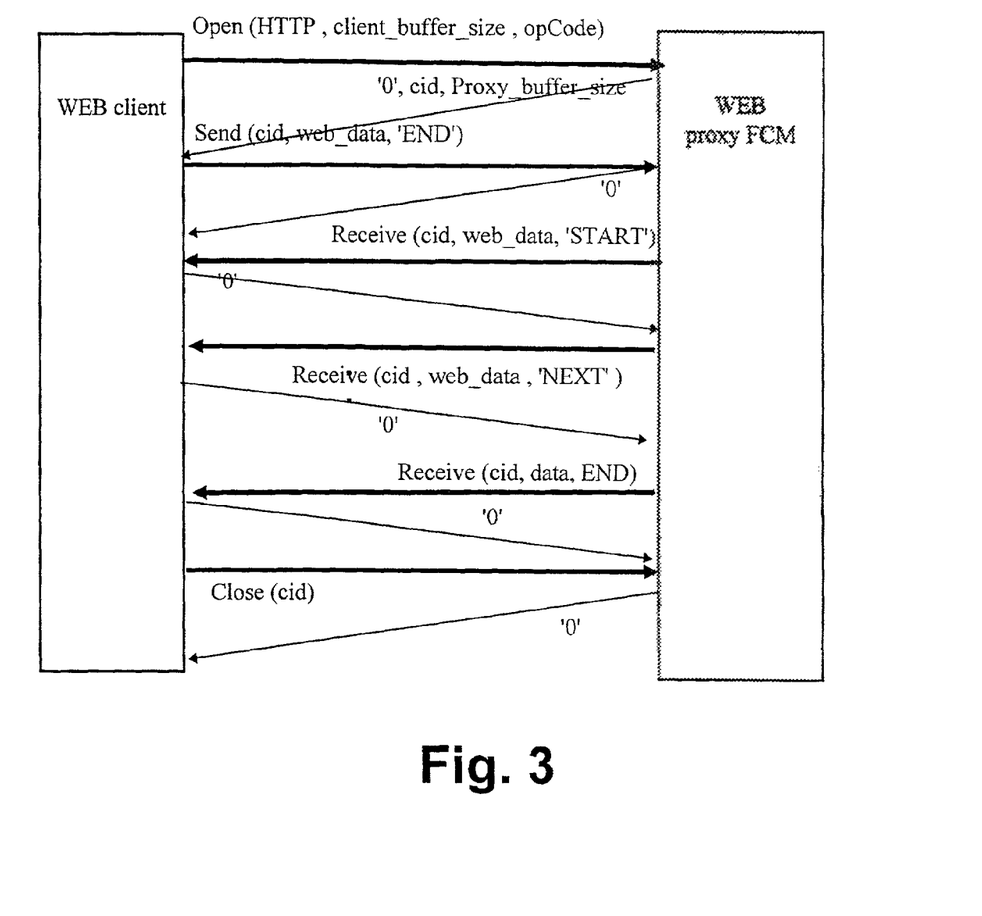
FIG. 3 is a diagram of the messages exchanged between the WEB client and the WEB proxy agent.

FIG. 3 gives an example of a typical message exchange between a WEB client and a WEB Proxy FCM. At the level of the Message Passing System, a function call can trigger messages in two directions: a first message from the calling software element to the called software element with 'in-bound' parameters sent to this called software element, and a second message in the inverse direction, for shuttling back 'out-bound' parameters, if required.

The 'Open' function, as illustrated in FIG. 3, gives rise to a first message from the WEB client to the WEB Proxy FCM. This message informs the WEB Proxy FCM of the protocol which will be used over the connection which is being opened, and of the size of the buffer which the WEB client allocates for return messages for that particular connection. Buffer sizes may be different from connection to connection. The WEB client also transmits the operation code of the Receive function, which the WEB Proxy FCM has to use to call the Receive function at the WEB client.

At the Message Passing System level, the WEB client also transmits its own identifier 'SEID'.

Assuming correct reception and processing, the WEB Proxy FCM responds by the return code '0' to indicate successful processing, sends a 'cid' value to identify the connection, and also transmits its own buffer size for further communication.

Once the connection open, the Web client proceeds to send a request to a WEB server, using the HTTP protocol. According to the example of FIG. 4, this request holds in a single message, which contains the connection identifier cid, the request under HTTP format, and the 'End' parameter. The WEB Proxy FCM acknowledges proper receipt, and forwards the request over the internet via its IP stack and modem.

Figure 4:
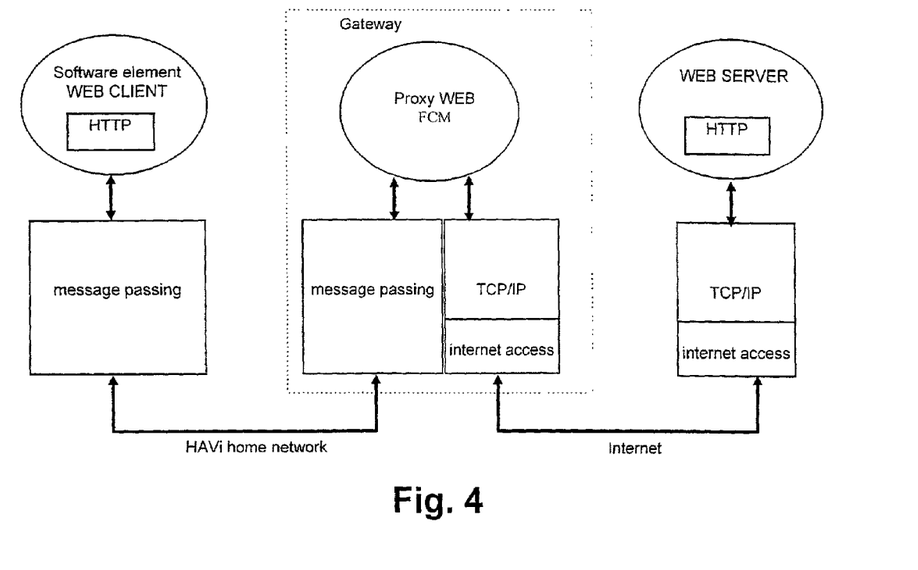
FIG. 4 is a diagram of the communication between software elements for establishing a communication between a WEB client software element and a WEB server via a WEB proxy agent.

The WEB server will respond with the requested data and transmit it to the WEB Proxy FCM. Since in the present example, the quantity of data is far beyond the buffer capacity of the WEB client, the WEB Proxy FCM splits the data into messages of appropriate size. The WEB Proxy FCM sends a first data block as a parameter within the Receive function call, using the operation code previously obtained from the WEB client, appended to the 'SEID' identifier of the WEB client. It uses 'START' as a parameter. Further messages are only sent after acknowledgment of receipt by the WEB client, to give it the time to process the received data and to empty its buffer. After having received the last data block, the WEB client closes the connection using the Close function. The WEB Proxy FCM answers by a last acknowledgment of receipt.

Lastly, according to the present embodiment, the configuration of the WEB Proxy FCM, for instance of the modem connection, is carried out directly by the user through a graphical interface provided by the Device Control Module which manages the WEB Proxy FCM. There is no specific application programmable interface for this task, which can be carried out using the data driven interaction (DDI) mechanism provided by the HAM specification.

GLOSSARY base AV device (BAV)
　A HAVi-compliant device containing HAVi SDD data but not running any of the software elements of the HAVi Architecture.
controller
　A device which controls other devices. An IAV or FAV device.
data driven interaction (DDI)
　A HAVi mechanism allowing control of software elements, eg DCMs, via user interface elements such as buttons and icons.
DDI controller
　A software entity which renders DDI elements and handles user interaction.
DDI element
　The DDI encoding of a user interface element.
DDI protocol
　The HAM messages supporting data driven interaction.
device
　A physical entity attached to the home network, examples are video players, recorders, cameras, CD and DVD players, set-top boxes, DTV receivers, and PCs.
device control application
　A HAVi software element allowing user control of a specific device (and its functional components). Installed on request and possibly on a different controller than the one on which the DCM is installed.
device control module (DCM)
　A HAVi software element providing an interface for controlling general functions of a device.
DCM code unit
　A HAVi bytecode unit to be loaded and installed on a FAV, or a proprietary code unit to be installed on a FAV or IAV. Installation of a DCM code unit results in one DCM and one or more FCMs and possibly one device control application.
embedded DCM
　A DCM implemented in native (i.e., platform dependent) code. Embedded DCMs typically run on IAV devices.
full AV device (FAV)
　A HAVi-compliant device which runs the software elements of the HAVi Architecture including a HAVi bytecode runtime.
functional component An abstraction within the HAVi Architecture that represents a group of related functions associated with a device. For example a DTV receiver may consist of several functional components: tuner, decoder, audio amplifier, etc.

functional component module (FCM)

A HAVi software element providing an interface for controlling a specific functional component of a device.

global unique ID (GUID)

A 64-bit quantity used to uniquely identify an IEEE 1394 device. Consists of a 24-bit company ID (obtained from the 1394 Registration Authority Committee) and a 40-bit serial number assigned by the device manufacturer. The GUID is stored in a device's configuration ROM and is persistent over 1394 network resets.

HAVi Architecture

The HAVi Architecture comprises the messaging model, control model, device model, and execution environment defined in this document.

HAVi bytecode

A portable code representation used by uploaded DCMs and possibly by applications. FAV devices contain a runtime environment for loading and executing HAVi bytecode. HAVi bytecode is not yet specified but will be selected from existing candidates.

HAVi-compliant device

A device supporting IEEE 1394, IEC 61883 and conforming to the HAVi Architecture specification for an FAV, IAV or BAV device.

HAVi level 1 interoperability

Refers to the features provided by IAVs and embedded DCMs.

HAVi level 2 interoperability

Refers to the features provided by FAVs and uploaded DCMs.

HAVi SDD data

Self Describing Device (SDD) data is stored in the IEEE 1212 Configuration ROM found on 1394 devices. HAVi specifies SDD data items that may be used for DDI elements or uploaded DCMs.

HAVi unique ID (HUID)

A unique identification of devices and their functional components. Persistent over changes in network configuration (i.e., device plug-in or plug-out).

home network

The home network is the generic name used to define the communications infrastructure within the home. This name is used as an abstraction from the physical media and associated protocols. A home network supports both the exchange of control information and the exchange of AV content.

intermediate AV device (IAV)

A HAVi-compliant device which runs the software elements of the HAVi Architecture but does not include a HAVi bytecode runtime environment.

legacy AV device (LAV)

A non HAVi-compliant device.

software element

A HAVi object. A software element responds to a set of messages specified by the API for that element.

software element ID (SEID)

A 80-bit value used to identify software elements. Not guaranteed to be persistent over changes in network configuration (i.e., device plug-in or plug-out).

uploaded DCM

A DCM implemented in HAVi bytecode. Uploaded DCMs run only on FAV devices.

The invention claimed is:

1. A communication method in a first network comprising at least first and second devices connected to a communication bus, wherein, the first device includes an internet application and second device includes means for connecting to a second network comprising an internet network, said method comprises:
    sending a first request from said first device to said second device for opening a connection between said first and second devices;
    sending an internet protocol request from said first device to said second device;
    forwarding said internet protocol request from said second device to a third device comprising an internet server in said second network;
    upon receipt, transferring a response from said third device in said second network to said first device through said second device over said communication bus; and
    sending by the first device an internet application protocol identifier to the second device to identify an internet application protocol to be used between the first device and the third device in said second network for sending and/or receiving data, said internet application protocol being selected from among a plurality of protocols supported by the second device.

2. A method according to claim 1 wherein a response by the second device to said request for opening a connection includes a message buffer size allocated to said connection by said second device.

3. A method according to claim 1 wherein, on the communication bus, a sending device splits data to be sent to a receiving device into messages of a size which is smaller than the size of the message buffer of the receiving device.

4. A method according to claim 1, further including sending, by the first device to the second device, a request for a list of internet application protocols supported by said second device upon request from the first device.

5. A method according to claim 1, further comprising sending, by the first device to the second device, an address of a function of said first device, said second device sending internet responses to said first device as parameters of a call of said function.

6. A method according to claim 1, wherein said second device attributes a connection identifier to a connection requested by said first device, said connection identifier being sent from said first device to said second device as acknowledgment of receipt for said request for opening said connection.

7. A method according to claim 6, wherein said first and second devices systematically use said connection identifier as parameter for function calls by said first device to said second device or vice-versa.

8. A device for connection to a communication bus and to the Internet, said device being referred to as second device, said second device comprising an IP protocol stack, the device comprising:
    a plurality of internet application protocols for forwarding requests and responses according to these protocols;
    an application programmable interface for allowing an internet application of a first client device connected to the communication bus in a first network to select one of said internet application protocols by specifying an internet protocol identifier, for use between the first client device and a third device, comprising an internet server, in a second network comprising the internet network, the second device receiving from the first client device a request to open a connection between the second device and the first client device, the request including a message buffer size allocated to message reception by the first client device for the connection on the communication bus.

9. A device for connection to a communication bus and to the Internet, said device being referred to as a second device, said second device comprising an IP protocol stack, the device comprising:
   a plurality of internet application protocols for forwarding requests and responses according to these protocols;
   an application programmable interface configured to: receive a first request from a first device for opening a connection between said first and second devices; receive an internet protocol request from said first device; forward said internet protocol request to a third device comprising an internet server in a second network; upon receipt, transfer a response from said third device in said second network to said first device over said communication bus; and receive from the first device an internet application protocol identifier that identifis an internet application protocol to be used between the first device and the third device in said second network for sending and/or receiving data, said internet application protocol being selected from among the plurality of protocols supported by said second device.

10. The device according to claim 9, wherein the application programmable interface is configured to transmit, in response to said request for opening a connection, a message including a message buffer size allocated to said connection by said second device.

11. The device according to claim 9, wherein, on the communication bus, a sending device, comprising one of the first and second devices, splits data to be sent to a receiving device, comprising respective ones of the second and first devices, into messages of a size which is smaller than the size of the message buffer of the receiving device.

12. The device according to claim 9, wherein the application programmable interface is further configured to receive from the first device a request for a list of internet application protocols supported by said second device upon request from the first device.

13. The device according to claim 9, wherein the application programmable interface is further configured to receive, from the first device, an address of a function of said first device, and in response send internet responses to said first device as parameters of a call of said function.

14. The device according to claim 9, wherein the application programmable interface is further configured to attribute a connection identifier to a connection requested by said first device, said connection identifier being received from said first device as acknowledgment of receipt for said request for opening said connection.

15. A device for connection to a communication bus and to the Internet, said device being referred to as a first device, said first device comprising:
   an interface for connecting with a second device via the communication bus, the second device including means for connecting to a second network comprising an internet network;
   an internet application, coupled with the interface for transmitting and receiving messages with the second device, the application configured to: send a first request from said first device to said second device for opening a connection between said first and second devices; send an internet protocol request from said first device to said second device; receive from the second device a response from a third device, comprising an internet server in a second network, via the second device over the communication bus, the internet protocol request being forwarded from the second device to the third device; and send an internet application protocol identifier to the second device to identify an internet application protocol to be used between the first device and the third device in said second network for sending and/or receiving data, said internet application protocol being selected from among a plurality of protocols supported by the second device.

16. The device according to claim 15, wherein the interface is configured to receive from the second device, in response to said request for opening a connection, a message including a message buffer size allocated to said connection by said second device.

17. The device according to claim 15, wherein, on the communication bus, a sending device, comprising one of the first and second devices, splits data to be sent to a receiving device, comprising respective ones of the second and first devices, into messages of a size which is smaller than the size of the message buffer of the receiving device.

18. The device according to claim 15, wherein the interface is configured to send to the second device, a request for a list of internet application protocols supported by said second device upon request from the first device.

19. The device according to claim 15, wherein the interface is configured to send to the second device an address of a function of said first device, said second device sending internet responses to said first device as parameters of a call of said function.

20. The device according to claim 15, wherein the interface is configured to send a connection identifier to said second device as acknowledgment of receipt for said request for opening said connection, whereby said second device attributes a connection identifier to a connection requested by said first device.

* * * * *